United States Patent
Gupta et al.

(10) Patent No.: US 12,126,178 B2
(45) Date of Patent: Oct. 22, 2024

(54) BOOSTING REACTIVE CURRENT INJECTION FROM WIND TURBINE GENERATORS

(71) Applicant: VESTAS WIND SYSTEMS A/S, Aarhus N (DK)

(72) Inventors: Manoj Gupta, Jaipur (IN); Janakiraman Sivasankaran, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 623 days.

(21) Appl. No.: 17/417,089

(22) PCT Filed: Nov. 28, 2019

(86) PCT No.: PCT/DK2019/050371
§ 371 (c)(1),
(2) Date: Jun. 21, 2021

(87) PCT Pub. No.: WO2020/125882
PCT Pub. Date: Jun. 25, 2020

(65) Prior Publication Data
US 2022/0052531 A1    Feb. 17, 2022

(30) Foreign Application Priority Data
Dec. 20, 2018 (DK) ............................ PA 2018 70844

(51) Int. Cl.
*H02J 3/38* (2006.01)
*F03D 7/02* (2006.01)
(Continued)

(52) U.S. Cl.
CPC ............ *H02J 3/381* (2013.01); *F03D 7/0284* (2013.01); *F03D 7/048* (2013.01); *H02J 3/16* (2013.01);
(Continued)

(58) Field of Classification Search
CPC .......... H02J 3/381; H02J 3/16; H02J 2300/28; F03D 7/0284; F03D 7/048;
(Continued)

(56) References Cited

U.S. PATENT DOCUMENTS

2005/0040655 A1   2/2005   Wilkins et al.
2008/0252076 A1   10/2008   Fortmann et al.
(Continued)

FOREIGN PATENT DOCUMENTS

CN    104094493 A    10/2014
CN    104396113 A    3/2015
(Continued)

OTHER PUBLICATIONS

Danish Patent and Trademark Office 1st Technical Examination for Application No. PA 2018 70844 dated Sep. 2, 2019.
(Continued)

*Primary Examiner* — Robert E Fennema
*Assistant Examiner* — Yvonne Trang Follansbee
(74) *Attorney, Agent, or Firm* — Patterson + Sheridan, LLP

(57) ABSTRACT

Operating a renewable energy generator forming part of a renewable energy power plant. During a fault experienced by a power network: determining an active current set point to enable a reactive current supply boost at the point of connection between the plant and the network, the active current set point being based on a voltage level associated with the generator and on operational characteristics of the generator, plant, power network and/or connecting network; calculating a time period for the reactive current boost, the time period being the maximum time that the active current set point can be maintained for; and controlling the generator during the calculated time period to alter active current output to the determined active current set point, thereby (Continued)

providing the reactive current supply boost at the point of connection.

16 Claims, 7 Drawing Sheets

(51) Int. Cl.
    *F03D 7/04*     (2006.01)
    *H02J 3/16*     (2006.01)

(52) U.S. Cl.
    CPC ............... *F05B 2270/1033* (2013.01); *F05B 2270/1071* (2013.01); *F05B 2270/337* (2013.01); *H02J 2300/28* (2020.01)

(58) Field of Classification Search
    CPC ...... F05B 2270/1033; F05B 2270/1071; F05B 2270/337
    See application file for complete search history.

(56) References Cited

U.S. PATENT DOCUMENTS

| | | |
|---|---|---|
| 2008/0252143 A1 | 10/2008 | Llorente Gonzalez et al. |
| 2010/0002475 A1* | 1/2010 | Folts ....................... H02J 9/062 363/37 |
| 2012/0267896 A1* | 10/2012 | Cousineau ............... H02H 7/30 290/55 |
| 2014/0339830 A1 | 11/2014 | Gupta et al. |
| 2017/0244251 A1* | 8/2017 | Nielsen ..................... H02P 9/04 |
| 2020/0073361 A1* | 3/2020 | Bapiraju ............ G05B 19/4065 |

FOREIGN PATENT DOCUMENTS

| | | |
|---|---|---|
| DE | 10105892 A1 | 9/2002 |
| EP | 2267306 A2 | 12/2010 |
| EP | 2573894 A2 | 3/2013 |
| EP | 2945242 A2 | 11/2015 |
| WO | 2016000220 A1 | 1/2016 |
| WO | 2020125882 A1 | 6/2020 |

OTHER PUBLICATIONS

PCT Notification of Transmittal of the International Search Report and the Written Opinion of the International Searching Authority, or the Declaration for Application No. PCT/DK2019/050371 dated May 2, 2020.

Chinese Patent Office, Office Action for Chinese Patent Application No. 201980092179.9, dated Jan. 6, 2024.

\* cited by examiner

BOOSTING REACTIVE CURRENT INJECTION FROM WIND TURBINE GENERATORS

TECHNICAL FIELD

The present invention relates to a method of controlling a renewable energy power plant, to a renewable energy power plant controller, and to a wind turbine power plant more generally.

BACKGROUND

Newly commissioned renewable power plants, and more particularly wind power plants, are expected to be able to operate and adapt to a number of different circumstances when connected to a power network. A wind power plant (WPP) typically comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC.

Grid codes commonly include specific requirements for reactive and/or active current supply by each power plant during a fault, such as a voltage deviation, experienced by the network. These requirements ensure that the network is fully supported throughout the fault and that recovery of the voltage level is sustained by the active and/or reactive current supplied by the wind power plant or plants.

To meet the grid code requirements during a fault, it is common for wind energy power plants to use compensation equipment to support reactive power supply. For example, static synchronous compensators (STATCOMs) may be used in addition to the wind turbine generators to maximise the output of reactive power. However, it is desirable to reduce the reliance on compensation equipment in order to improve the balance of plant.

It is an aim of the present invention to improve upon conventional solutions.

SUMMARY OF THE INVENTION

According to an aspect of the present invention there is provided a method for operating a renewable energy generator forming part of a renewable energy power plant, the renewable energy power plant being connected to a power network at a point of connection by a high impedance connecting network. The method comprises: during a fault experienced by the power network: determining an active current set point to enable a reactive current supply boost at the point of connection, the active current set point being based on a voltage level associated with the generator and on operational characteristics of the generator, power plant, power network and/or connecting network; calculating a time period for the reactive current boost, the time period being the maximum time that the active current set point can be maintained for, and controlling the renewable energy generator during the calculated time period to alter active current output to the determined active current set point and to boost reactive current supply at the point of connection.

By enabling a boosted injection of reactive current, the renewable energy power plant is able to supply a higher level of reactive current and so less reactive power compensation is required. If requirements of the power network specify particular levels of reactive current injection during a fault, these can now be met and the size of the compensation equipment can be reduced. The consequence of this is that the balance of plant is improved, and less expenditure is needed for compliance with the network requirements. The method provided can be applied to both new and existing plants because the requirement for additional equipment is minimal.

A connecting network has a high impedance if the current flow per unit voltage is low. As a result, high current set points are required to overcome the high-impedance network.

The fault may be a voltage deviation, or may be caused by a voltage deviation.

The term reactive current supply boost is intended to mean that the reactive current level supplied from the generator is above the level it would conventionally be at in that situation. It is boosted relative to the conventional level.

The method may comprise determining that a voltage level at the point of connection between the power plant and the network is in a pre-determined range. The method may comprise performing the steps of the above method if the voltage level is in the pre-determined range. Applying the method in a particular range provides a useful benefit that the resulting boost is only applied when required, and permits conventional operation of the generator at other times.

The active current set point may be based on an active current injection profile derived from one or more operational characteristics of the generator, power plant, power network and/or connecting network. The operational characteristic may be impedance of the connecting network. The impedance may be measured based on measurements of the connecting network, or may be estimated. The estimation may be based on a model of the network. Deriving the profile from the characteristics, and particularly the impedance, permits a reactive current boost that meets requirements of the power network.

The time period for the reactive current boost may be calculated based, at least in part, on a thermal capacity of a chopper circuit of the renewable energy generator. The method may comprise determining the thermal capacity of the chopper circuit. Basing the time period on the chopper circuit ensures that damage to the chopper circuit is avoided.

Determining the thermal capacity of the chopper circuit of the renewable energy generator may comprise modelling the operation of the chopper circuit. Determining the thermal capacity of the chopper circuit of the renewable energy generator may comprise calculating the thermal capacity of the chopper circuit based upon the model. Alternatively or additionally, determining the thermal capacity of the chopper circuit of the renewable energy generator may comprise monitoring at least one parameter of the renewable energy power plant, the grid, the connection between the renewable energy power plant and the grid, or of the renewable energy generator. Determining the thermal capacity of the chopper circuit of the renewable energy generator may comprise calculating the thermal capacity of the chopper circuit based upon the monitored parameter.

The at least one parameter may be the active power output of the renewable energy generator prior to the fault. The time period for the reactive current boost may be calculated, at least in part, based on a maximum duration of the fault.

The method may comprise calculating a remaining time for the fault if the fault is not cleared at the end of the time period. The method may comprise activating compensation equipment for the remaining period to supply maximum reactive current if the fault is not cleared at the end of the time period. The method may comprise controlling the renewable energy generator during the remaining time period to alter active current output according to a second active current set point if the fault is not cleared at the end of the time period. The second set point may be based on a second active current injection profile derived from predetermined requirements of the power network. The second set point may be a maximum active current set point.

According to another aspect of the invention, there is provided a controller configured to control a renewable energy generator according to the method described above.

The renewable energy generator may be a wind turbine generator. The renewable energy power plant may be a wind power plant.

According to another aspect of the invention, there is provided a computer program downloadable from a communication network and/or stored on a machine readable medium, comprising program code instructions for implementing the method described above.

According to another aspect of the invention, there is provided a renewable energy generator comprising the controller described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
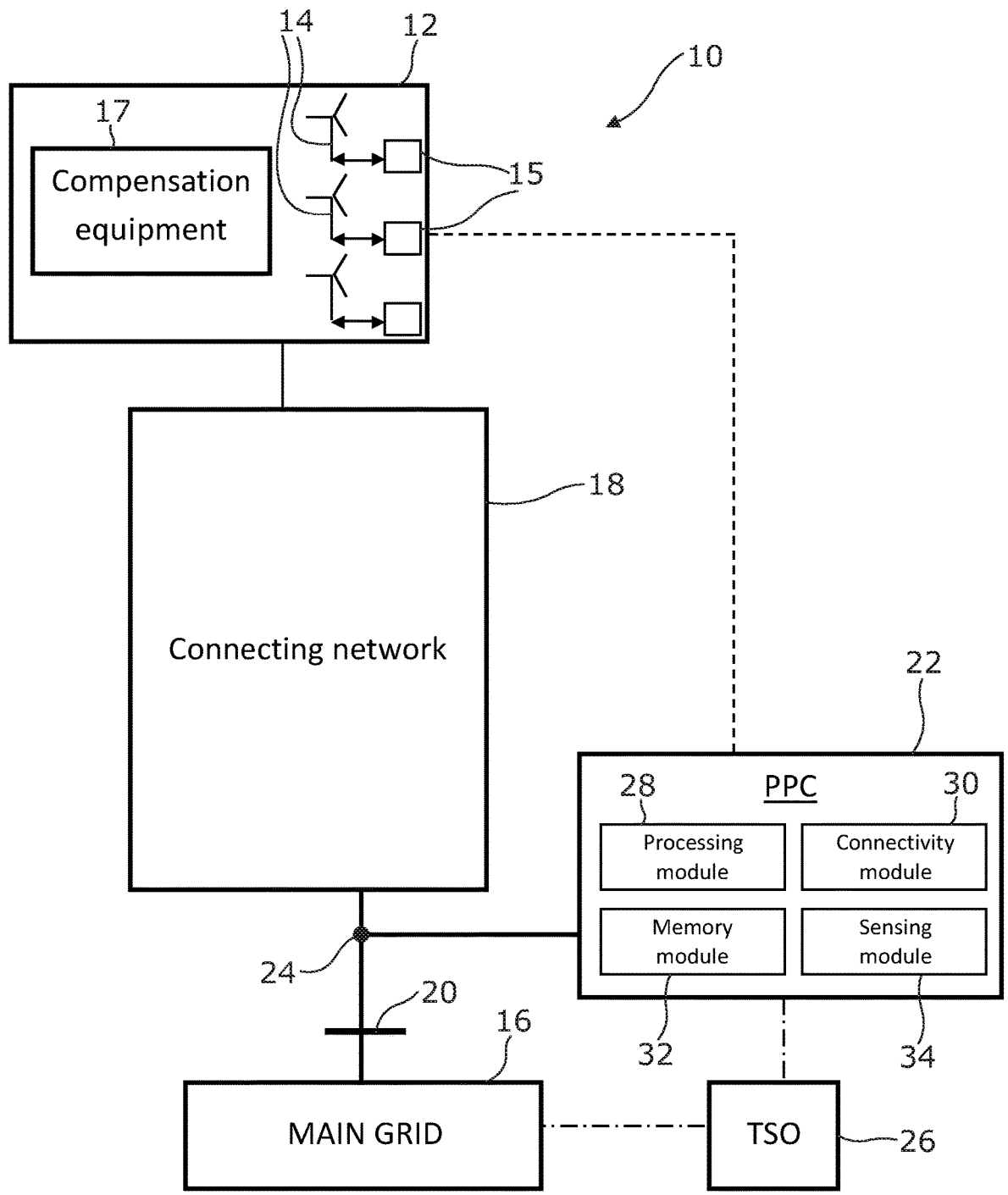
FIG. 1 is a schematic representation of a wind power plant, its connection to a grid, and its control system.
Figure 2:
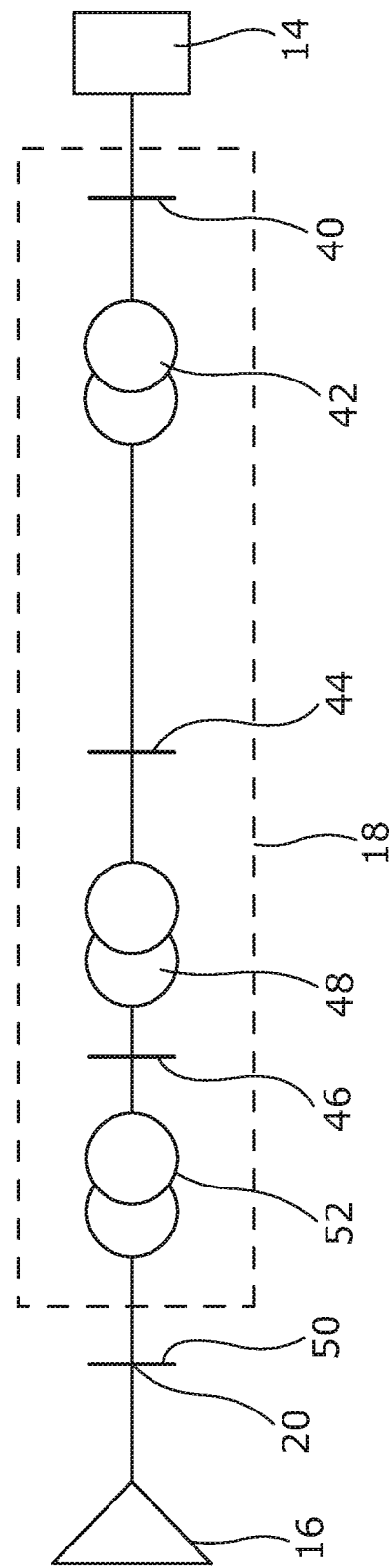
FIG. 2 is a schematic representation of a connecting network having a high impedance main transformer.

FIG. 1 illustrates a typical architecture in which a wind power plant (WPP) is connected to a main transmission grid as part of a wider power network, while FIG. 2 illustrates a typical connecting network between the WPP and the grid. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to both wind power plants, power plants for other renewable energy sources, wind turbine generators and other renewable energy generating sources. Thus, the invention also relates to renewable energy power plants and renewable energy generators in general, rather than being specific to wind power plants and generators as in the Figures. In addition, the skilled reader will appreciate that methods, systems and techniques also described below may be applicable to many different configurations of power network. Moreover, the components of the wind power plant and power network are conventional and as such would be familiar to the skilled reader. It is expected that other known components may be incorporated in addition to or as alternatives to the components shown and described in FIGS. 1 and 2. Such changes would be within the capabilities of the skilled person.

FIG. 1 shows a power network 10 incorporating a WPP 12. The WPP 12 includes a plurality of WTGs 14. Each of the plurality of WTGs 14 converts wind energy into electrical energy, which is transferred from the WTGs 14 to a main transmission network or main grid 16, as active current, for distribution. Although not shown in FIG. 1, it will be appreciated that each of the WTGs 14 incorporates, among other components, a braking element activatable to consume excess energy. Typically, in wind turbines, the braking element takes the form of a chopper circuit having a switching unit and a chopper resistor, where the switching unit is used to include the resistor in a circuit, while the resistor converts excess electrical energy to heat energy. Chopper circuits are useful in reducing active current or power output from each WTG 14. The operation of chopper resistors, also known as 'dump loads', is discussed in detail in 'Wind Turbines' by Erich Hau, published 2006. In particular Chapter 10.4 discusses their operation.

The WPP 12 also includes compensation equipment 17, such as a static synchronous compensator (STATCOM), configured to provide reactive power or reactive current support as required.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current requests received from a power plant controller (PPC) 13. During extraordinary conditions, the WTG controllers 15 operate to fulfil predetermined network requirements, and also act to protect the WTGs 14 from any potentially harmful conditions.

Particularly, the WTG controller 15 controls the operation of the WTG 14 during a grid fault to act as an autonomous current source and to supply reactive and active current to support grid recovery and to comply with grid requirements.

According to the methods described herein, the control of the WTGs provides improved reactive current support by the WTG 14 without the requirement for high capacity compensation equipment.

The WPP 12 is connected to the main grid 16 by a connecting network 18. The WPP 12 and the main grid 16 are connected at a Point of Interconnection (PoI) 20, which is an interface between the WPP 12 and the main grid 16. The connecting network 18 is described in more detail in relation to FIG. 2 below.

A Power Plant Controller (PPC) 22 is connected to the power network at a Point of Measurement (PoM) 24 and is connected directly to the WPP 12. The role of the PPC 22 is to act as a command and control interface between the WPP 12 and the grid 16, and more specifically, between the WPP 12 and a grid operator or transmission system operator (TSO) 26. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

FIG. 2 illustrates an example connecting network 17 that is a high-impedance connecting network having a long transmission line between one WTG 14 of the WPP and the PoI 20. FIG. 2 also illustrates part of the local grid of the WPP 12.

In FIG. 2, the WTG 14 is connected to a low-voltage bus 40 via a feeder line. Where the WPP 12 comprises more than one WTG 14, the low-voltage bus 40 is the point of connection of the WTGs 14. A WTG transformer 42 connects the low-voltage bus 40 to a medium-voltage bus 44 via another feeder line. The medium-voltage bus 44 may be a substation bus. Aggregated collector network cables may be connected to the feeder line between the transformer 42 and the medium-voltage bus 44.

The medium-voltage bus 44 may be at a voltage level that is suitable for relatively short distance power transmission, for example in the region of 10 kV to 150 kV, most usually between 110 kV and 150 kV. The medium-voltage bus 44 may also provide a point of common coupling (PCC) for a plurality of WPPs 12, although, only a single WPP 12 is only shown in FIG. 1 and a single WTG 14 is shown in FIG. 2 for simplicity.

The medium-voltage bus 44 is connected to a first high-voltage bus 46, via a first main transformer 48. The first high-voltage bus 46 is connected to a second high-voltage bus 50 via a second main step-up transformer 52. The second high-voltage bus 50 is the PoI 20. The buses and step-up transformers are connected by transmission lines.

While the low- and medium-voltage bus 40, 44 may be required to span distances up to around 100 km, the main grid 16 and high-voltage buses 46, 50 may be an international, national, or regional grid such as the National Grid of Great Britain, for example, and therefore may be required to span distances of up to around 250 km or more. More typically, the low- and medium-voltage bus 40, 44 span 10 to 20 km. Accordingly, the voltage level of the main grid 16 and the high-voltage buses 46, 50 may be much higher than the voltage level of the other, lower voltage buses 40, 44 for better transmission efficiency. As such, the main transmission grid 16 may comprise a plurality of substations and additional buses operating at different voltages as well as further transformers to increase the voltage for improved transfer of power.

In the arrangement of FIG. 2, it is envisaged that the voltages of the low-voltage bus 40, medium-voltage bus 44, and first and second high-voltage buses 46, 50, will range between 0.1 kV to 500 kV. The voltage level of the low-voltage bus 40 may between approximately 0.1 kV and 5 kV, typically up to 1 kV. The voltage level of the medium-voltage bus 44 may between approximately 10 kV and 50 kV, typically 11 kV, 22 kV, or 33 kV. The voltage level of the first high-voltage bus 46 may between 50 kV and 300 kV. The voltage level of the second high-voltage bus 50 maybe between 200 kV and 500 kV. High voltage levels may be 66 kV, 110 kV, 132 kV, 230 kV, 330 kV, or 400 kV. The main grid 16 may have an operational voltage in excess of 200 kV. In some configurations, the operational levels of each bus may be lower or higher than the stated ranges, and the grid may operate at voltages below 200 kV.

In one particular example, the voltages of the low voltage, medium-voltage, first high-voltage, and second high-voltage buses are 0.65 kV, 33 kV, 230 kV, and 400 kV respectively.

In long connecting networks, such as the example of FIG. 2, the impedance between each WTG and the grid is high because of a long transmission line and the requirement for one or more main transformers. Due to the high impedance of the connecting networks, higher retained per-unit voltage levels are measured at the WTG terminal than at the PoI (or PoM). A measured per-unit voltage level at the WTG terminal may, in some instances, be up to 20% larger than the measured per-unit voltage at the PoI.

Per-unit (p.u.) voltage is an expression of the voltage with respect to a base value which is used as a reference. Using a per-unit system allows for normalization of values across transformers and other components that may change the value by an order of magnitude.

This difference in per-unit voltage levels is brought into focus when considering active current injection set-points for grid fault scenarios. The operation of the WPP 12, and particularly individual WTGs, in reaction to a grid fault is especially important and requires careful control of power and current outputs to support the grid 16, and enable an efficient and safe recovery to normal operating levels.

As will be understood by the skilled person, a grid fault, also known as a voltage deviation or excursion, is generally defined as a period in which the voltage level of a grid or wider power network drops to a level outside the accepted and normal operational bounds. During a grid fault, WTGs act in a low-voltage ride-through (LVRT) mode, in which they do not take set points for their active or reactive power or current output from the PPC. Instead, WTGs operate as autonomous sources and operate to control active and reactive current in order to support effective voltage recovery during the fault, and until voltage levels return to normal operational levels, typically between 0.9 p.u. voltage, and 1.1 p.u. voltage.

WTGs, as part of a WPP, supporting the grid during a grid fault by operating in LVRT mode are also typically required to supply active current at a level that is appropriate to the voltage level of the grid in that LVRT mode In WPPs having long connecting networks having a high impedance, active current injection profiles are determined so that above a threshold voltage level measured at the PoI the active current set points are high. The setting of high active current set points satisfies long LVRT requirements, as the WTGs are operated within the capabilities of the chopper circuit. The difference in per-unit voltage levels experienced across the high impedance network results in high active current set points for a large range of voltages. The reason for this is that active current levels are difficult to control at high voltage levels. Setting high active current set points ensures compliance.

Figure 3A:
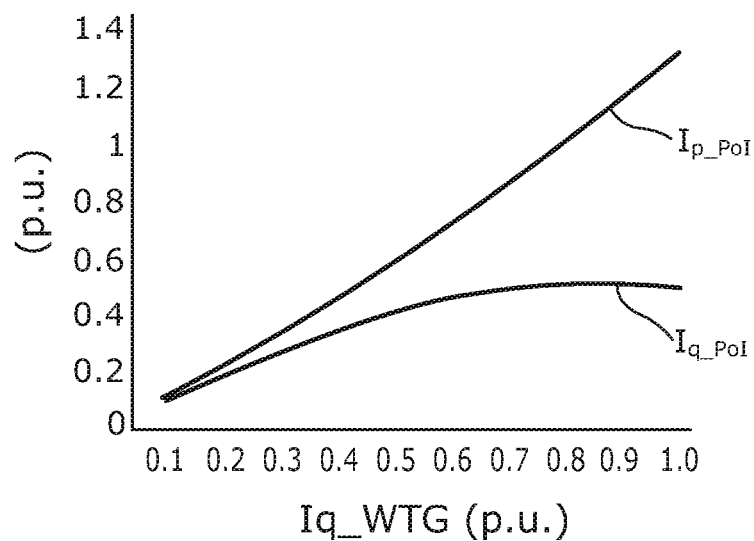
FIG. 3a to 3c are charts illustrating a relationship between current levels measured at generator terminals and measured at the point of interconnection.

For WPPs, and renewable energy power plants otherwise, it is consequently difficult to meet reactive current injection requirements during a grid fault because of high active current set points. FIG. 3a illustrates measured active current and reactive current at the PoI, labelled $I_{p\_PoI}$ and $I_{q\_PoI}$ for a measured value of the respective parameter at a terminal of a WTG, where both values are at measured at the same level. So, for example, reading from the chart of FIG. 3a, when reactive and active current at the WTG terminal are both measured as 0.5 p.u., the active current and reactive current levels measured at the PoI are 0.6 and 0.4 respectively. As can be seen from the chart, if any reactive current level above 0.5 is required, it will not be possible to meet this requirement when active current levels are high as a result of a high impedance system, such as that of FIG. 2.

Instead of the WTGs providing increased reactive current supply, high capacity compensation equipment is required to fulfil reactive current requirements. Higher reactive current requirements or longer periods for which reactive current is required lead to a requirement for large, higher capacity compensation requirement that is costlier to operate.

Figure 3B:
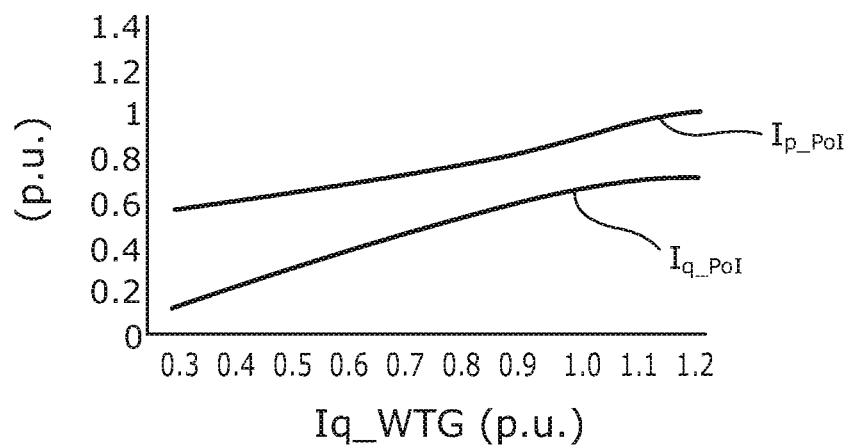
Figure 3C:
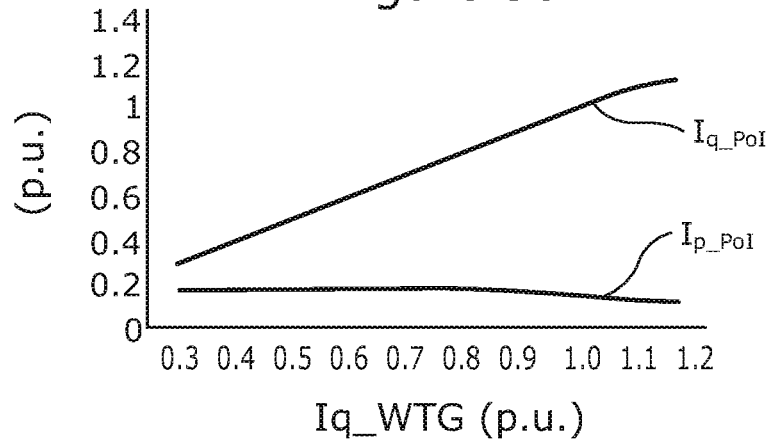

It has been identified that higher reactive current levels are achievable at the PoI when active current output is reduced. This is illustrated in FIGS. 3b and 3c. In FIG. 3b, the active current level at the wind turbine generator is maintained at 0.5 p.u., and in FIG. 3c, active current level at the wind turbine generator is maintained at 0.15 p.u. In both Figures, reactive current level is increased as shown on the x axis. In FIG. 3b, the maximum reactive current level is increased when compared to the levels of FIG. 3a. It is also notable that the curve has greater linearity than the curve of FIG. 3a. In FIG. 3c, the maximum reactive current level is further increased when compared to the previous levels, and is almost proportional to reactive current injection at the WTG terminal.

The potential to reduce active current to achieve a reactive current boost is leveraged to improve compliance of reactive current supply by WTGs during a grid fault. This is achieved by the method 400 of FIG. 4 and, where necessary, the method 500 of FIG. 5.

Figure 4:
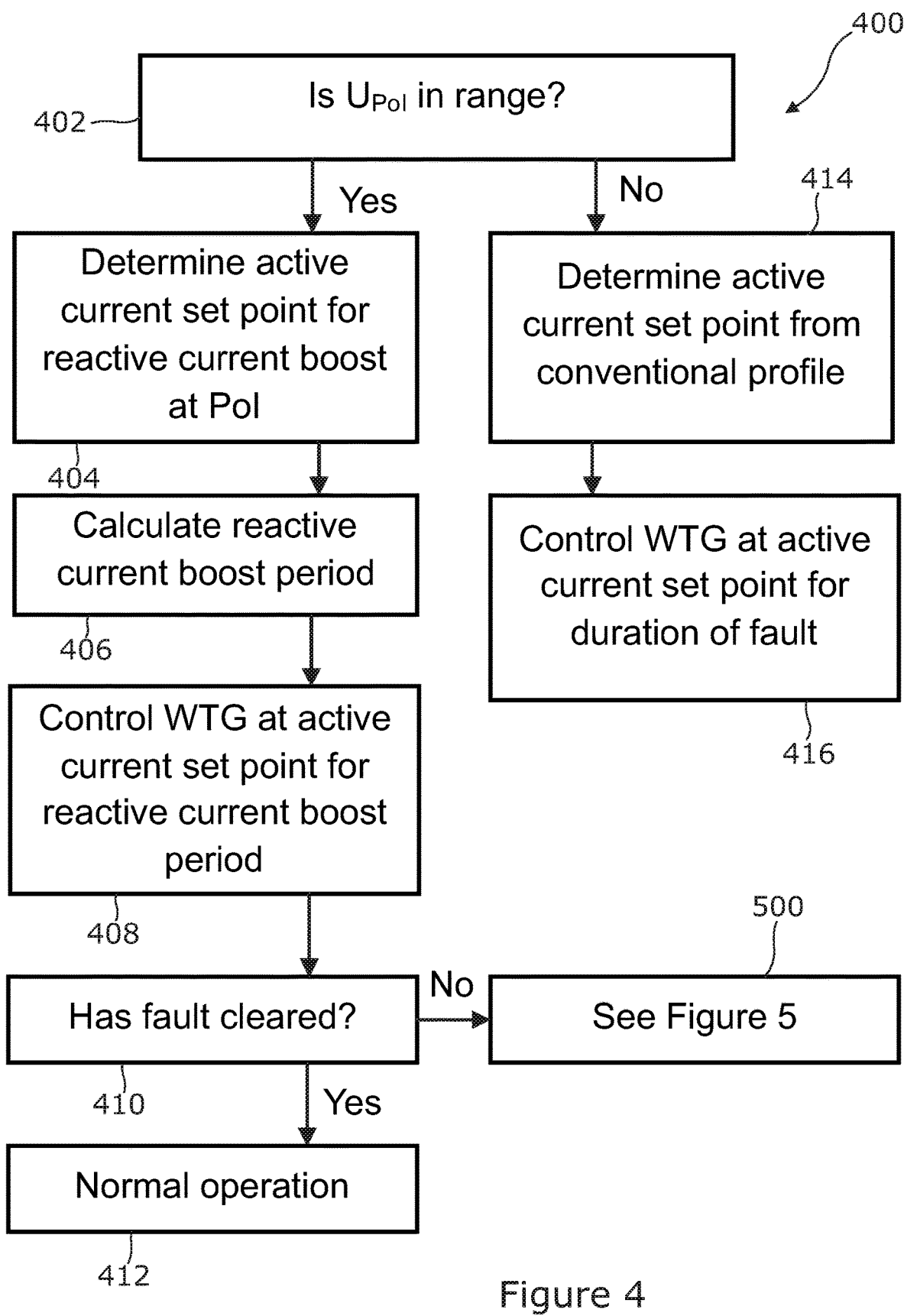
FIG. 4 is a flow chart governing the operation of a wind turbine generator during a fault to boost reactive current injection.

Considering the method 400 of FIG. 4, the first step of the method is an optional determination 402 whether a voltage at the PoI 20, $U_{PoI}$, is within a range of values. To determine this, the voltage level may be compared to one or more predetermined thresholds. For example, it is envisaged that a lower threshold of between 0 p.u. and 0.5 p.u. may be used, and that an upper threshold may be the voltage level at which the fault ride-through mode can be terminated. This step is optional, as method may also be performed continuously without a specific voltage range requirement.

If the voltage level is in the desired range ('Yes'), an active current set-point is calculated 404 that is suitable for implementing a boosted reactive current level at the PoI 20. It is seen from FIGS. 3a to 3c that the highest levels of reactive current level at the PoI 20 are obtained by a large reduction in active current levels. Therefore, to obtain a high reactive current level at the PoI 20 for a 'boost', the active current level should be reduced to a minimum. The minimum active current level is obtained by reference to an active current injection profile.

Figure 6:
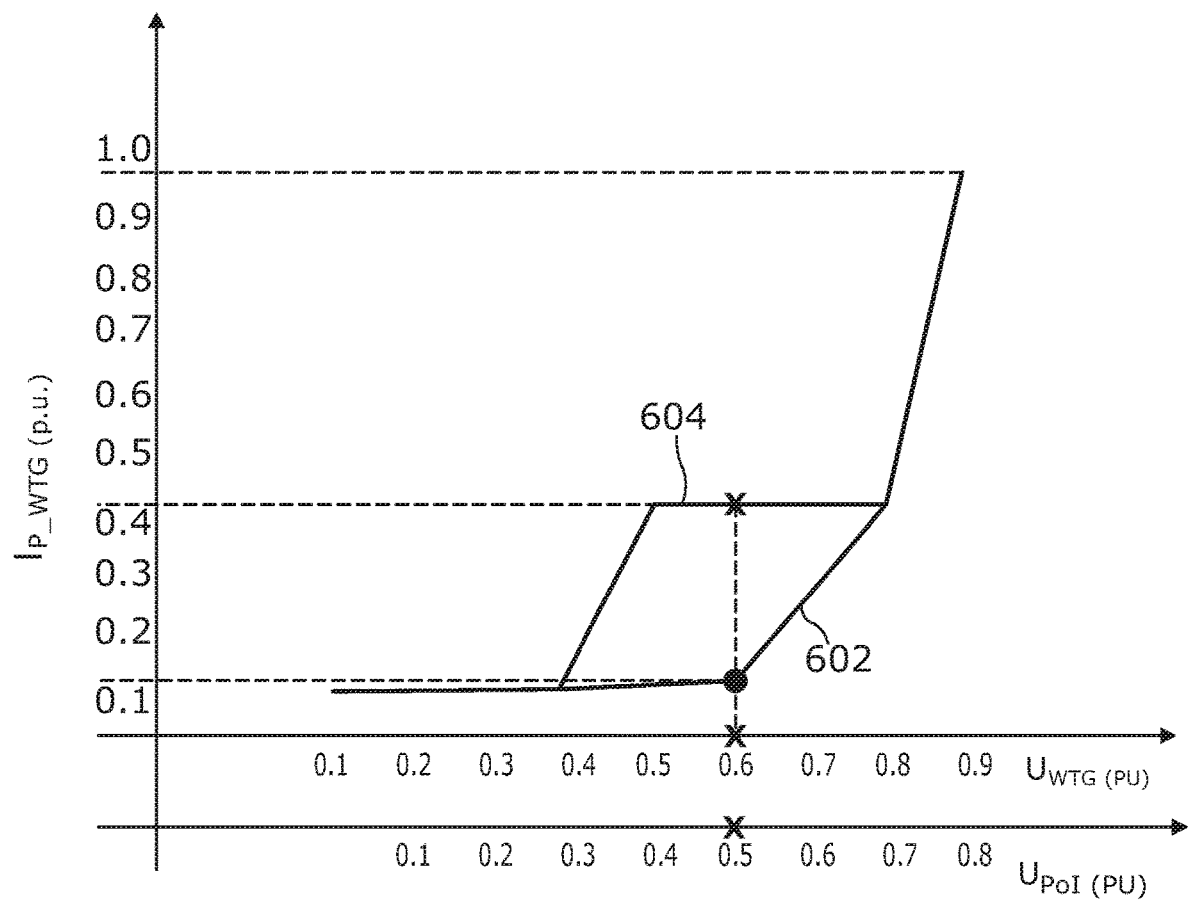
FIG. 6 is a chart illustrating a conventional active current injection profile and an adapted active current injection profile.

In some examples, a dedicated active current injection profile specifically for use when reactive current boost is required is utilised. The dedicated profile, an example of which 602 is shown in FIG. 6 in conjunction with a conventional active current injection profile 604, is generated for each individual system based on operational characteristics of the system, where the system is the WPP 12, the connecting network 17 and their interconnection 20 with the grid. The dedicated profile 602 may be predetermined or may be updated based on measured parameters of the system. The dedicated profile 602 is determined to provide the minimum active current injection level that is achievable for a given voltage level at the 20 PoI. It is envisaged that the dedicated profile 602 will be generated based on impedance in the connecting network and the local grid of the WPP 12, as well as any grid requirements set out by the TSO 26. At the same time as determining the dedicated profile 602, a maximum active current set point may also be calculated. The maximum active current set point is set according to requirements of the power network, such as those set down in the grid code. The maximum active current set point may be an absolute maximum active power available, or may be less than the absolute maximum active power available.

In FIG. 6, the dedicated active current injection profile 602 for reactive current boost is lower than the conventional active current injection profile 604 between voltage levels of 0.4 and 0.8 p.u. voltage measured at the WTG terminal, which corresponds to between 0.3 and 0.7 p.u. voltage measured at the PoI. This is therefore the range to which the first step of the method of FIG. 4 refers. FIG. 6 is considered in more detail later when the applications of the methods of FIG. 4 and FIG. 5 to a voltage scenario are considered.

Returning to FIG. 4, a reactive current boost period is calculated 406. The reactive current boost period is the period for which reactive current can be boosted at the PoI 20. As discussed above, a reactive current boost may be implemented purely by reducing active current output from the WTG 14, or by actually increasing reactive current output from the WTG 14, or by a combination of the two.

The WTG 14 is controlled 408 to output active current at the active current set point for the duration of the reactive current boost period.

Figure 5:
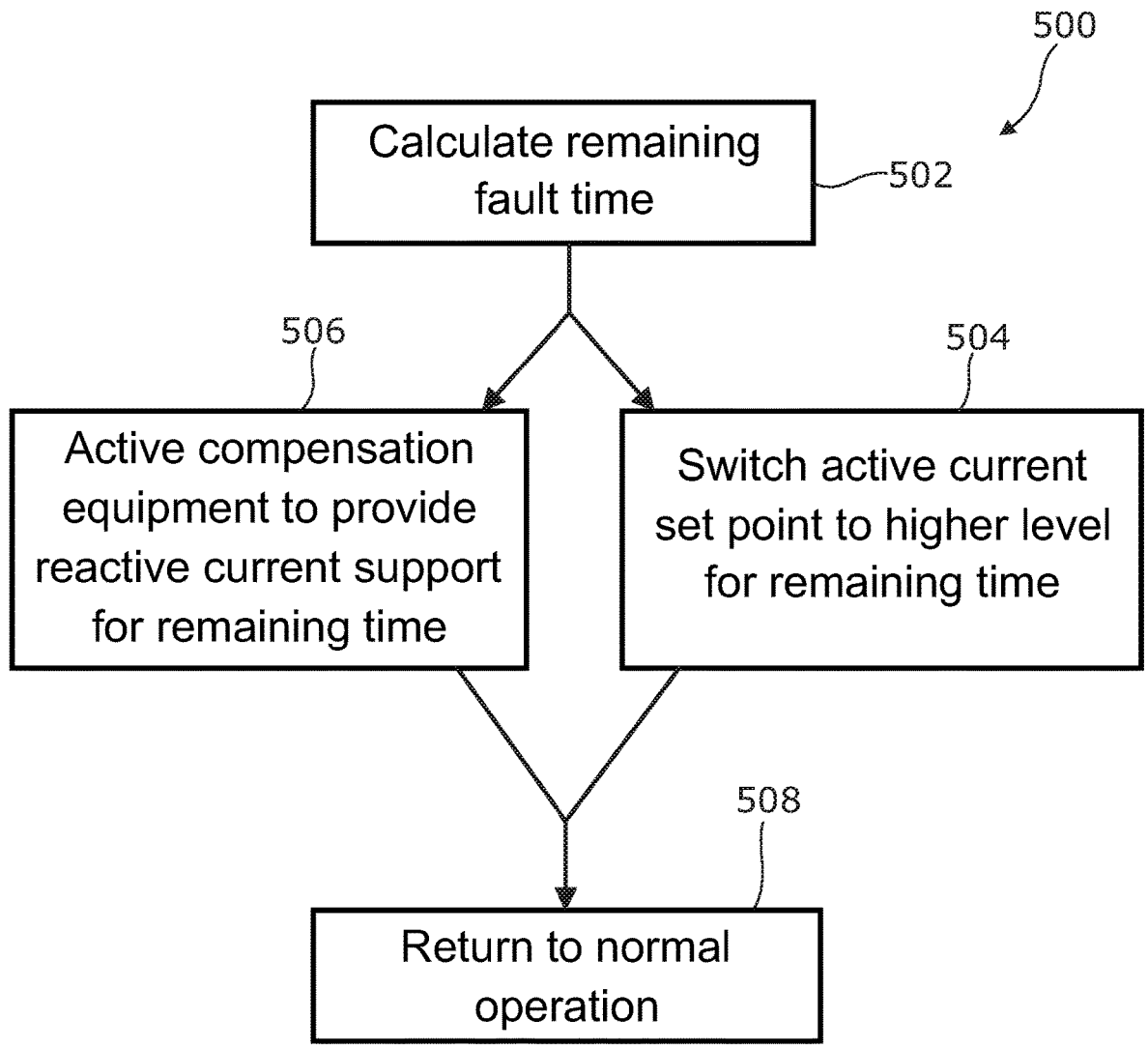
FIG. 5 is a flow chart governing the operation of a wind turbine generator during a fault following a reactive current boost.

In an optional step, it is determined 410 if the fault has cleared at the end of the boost period, and if it has ('Yes'), the WTG 14 returns 412 to normal operation. If the fault has not cleared ('No'), then the method 500 of FIG. 5 is followed. This method is described below. This determination step 410 is optional as it depends on how the boost period is calculated, as is explained below.

If, initially, the voltage level is not within the specified range ('No' in response to step 402), the conventional profile of FIG. 6 is used to determine 414 an active current set point, and the WTG 14 is controlled 416 according to the conventional set point for the duration of the fault.

The boost period is calculated 406 according to the operational capabilities of the WTG 12. Particularly, the boost period is dependent on a time period over which it is safe to operate the WTG 12 at the reduced active current level and/or the boosted reactive current level. The safe operation depends, in part, on the thermal capacity of components within the WTG 12.

In a typical WTG, a reduction in active current is enabled, at least in part, by the chopper circuit, which permits the 'dumping' of active current as heat energy through a resistor. The dissipation of excess energy by the chopper resistor may cause increases in temperature of the chopper resistor. Overheating of the chopper resistor is undesirable and dangerous, so the chopper resistor and therefore chopper circuit have a thermal capacity. The thermal capacity of the chopper circuit can be defined as the maximum temperature rise permitted in operation of the chopper circuit. The thermal capacity corresponds to the maximum amount of energy that can be dissipated using the chopper circuit before the chopper resistor overheats. To avoid the overheating of the chopper resistor, a limit is placed on the reactive current boost period according to the thermal capacity of the chopper circuit in the present method. The thermal capacity of the chopper circuit, or any other component in the WTG, may be determined using modelling of that component, monitoring of a parameter that may affect the thermal capacity such as active power prior to the fault, measurement of the rate of change of temperature of the component or another parameter, or with reference to look-up tables.

The reactive current boost period may depend on a number of factors, including the thermal capacity of the chopper circuit, other operational characteristics of the wider network or system, and/or measured parameters from the wider system.

In some examples, the reactive current boost period also depends on a maximum duration of the grid fault, which is a parameter that is obtained from the grid code. The maximum fault duration is determined for a given voltage level at the PoI. In this case, the reactive current boost period would be the shorter of the maximum duration of the grid fault and the maximum period for a reduced active current level within the thermal capacity of the components of the WTG.

If the maximum fault duration exceeds the period over which the WTG reaches its thermal capacity, the method of FIG. 5 may be required. If the reactive current boost period is the maximum fault duration, the check in FIG. 4 to establish whether the fault has cleared is not required, and so the method returns the WTG to normal operation instead.

As described above, the method 500 of FIG. 5 is performed if the fault is not cleared after the boost period. In the method, the remaining fault time is calculated 502. This calculation is the difference between the maximum fault duration and the boost period duration. If the maximum fault duration is not calculated during the calculation of the boost period, it may also be initially calculated here before calculating a remaining time.

For the remaining time, the active current set point is switched 504 a higher level for calculated remaining time so as not to exceed the thermal capacity (or other operational capabilities) of the WTG. The higher level may be the level specified by a conventional injection profile, a maximum active current level or any level between the maximum and the reduced active current set point.

As the active current set point, and therefore the active current output from the WTG, is increased, the reactive current level at the PoI will reduce, as demonstrated in FIG. 3a. In order to be compliant with the grid code and supply reactive current to support recovery at the same level, compensation equipment is activated 506 simultaneously or substantially simultaneously to provide reactive current support for the remaining time.

After the remaining time, the fault is cleared and normal operation is resumed 508.

Because the WTGs are able to meet reactive current requirements during the fault for a larger proportion of the time by applying the present methods than would ordinarily be possible, the capacity of the compensation equipment required can be reduced. Therefore, new WPPs are cheaper and simpler to maintain, and the capability of WTGs are maximised without the requirement of additional hardware.

Furthermore, the methods improve the operation of the plant in a fault without input being required from the PPC.

Figure 7:
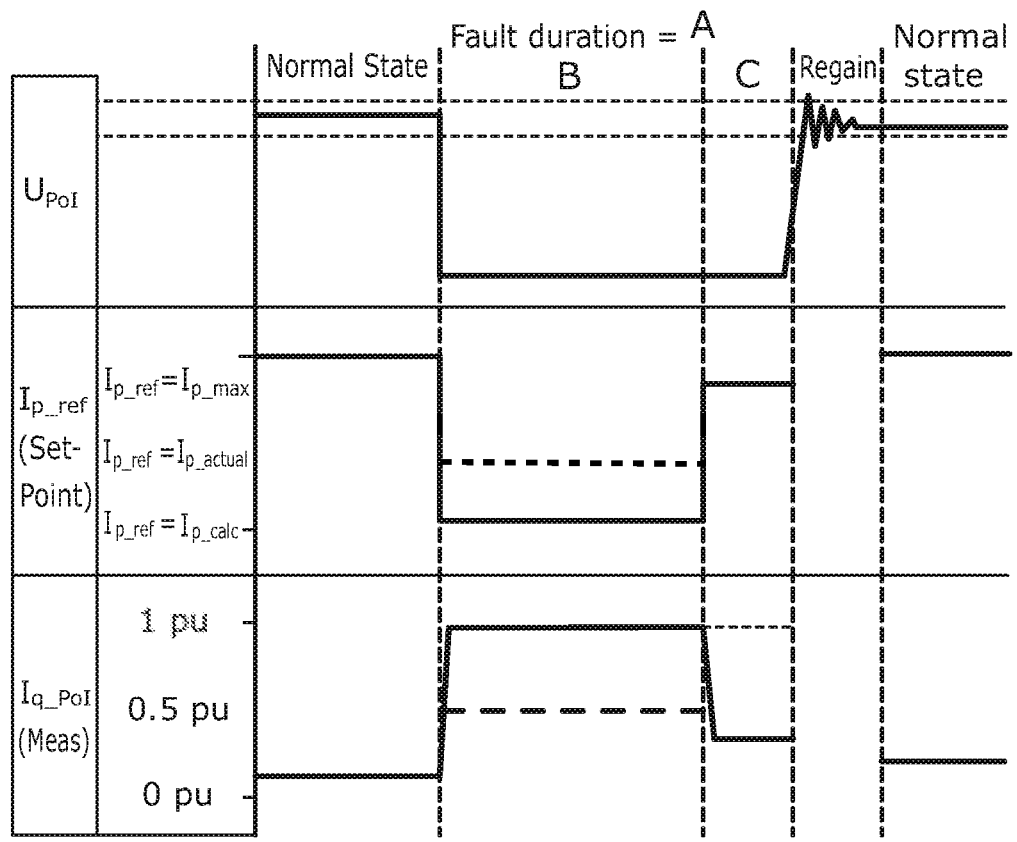
FIG. 7 is a chart illustrating operation of a wind turbine generator according to the methods of FIGS. 4 and 5.

The application of FIGS. 4 and 5 to a voltage scenario is depicted in FIG. 7, as will now be described with reference to FIGS. 4 to 7.

As discussed above. FIG. 6 illustrates an example dedicated active current injection profile 602, along with a conventional active current injection profile 604. This example dedicated active current injection profile 602 deviates from the conventional profile between 0.4 p.u. and 0.8 p.u. voltage at the WTG terminal, although it will be appreciated that the active current injection profiles 602, 604 may differ over any voltage level range.

FIG. 7 illustrates a grid fault scenario, where voltage deviates from its normal operational range, and the reactions to the change in voltage of reactive current at the PoI and active current set-point when a WTG is operated according to the methods of FIGS. 4 and 5. FIG. 7 comprises three charts illustrating a voltage level during a fault scenario in the uppermost chart, and the concurrent response of active current set point used by the WTG and the reactive current level measured at the PoI in the middle and lowermost charts respectively. The charts of FIG. 7 assume that the system including the WPP also includes a high-impedance connecting network such as that shown in FIG. 2.

Beginning at FIG. 7, the voltage level is initially within its normal operational bounds (typically 0.9 p.u. to 1.1 p.u voltage at the PoI). In the normal operational mode of the WTG, the active current and reactive current levels are at a maximum level and close to a minimum level respectively. At time t1, a fault occurs, and the voltage drops and deviates from its normal operational bounds. For the purposes of this example, it will be assumed that the voltage level deviates to 0.5 p.u. voltage at the PoI. As can be seen from FIG. 6, 0.5 p.u. voltage measured at the PoI corresponds to 0.6 p.u. voltage at the WTG terminal.

Turning to the method, the voltage level at the PoI, $U_{PoI}$, is now within the range within which reactive current boost can be implemented. The active current set point for reactive current boost is determined using the profile shown in FIG. 6. Using the conventional profile, the set point measured at the WTG terminal would be 0.42 p.u. However, as the dedicated injection profile for the system is used, the determined set point is 0.12 p.u. instead.

In this example, the calculation of the reactive current boost period comprises the calculation of the maximum fault duration, here calculated as time 'A', and the calculation of the maximum duration limited by the thermal capacity of the chopper circuit, which is calculated as time 'B'. B is less than A, B is used as the reactive current boost period.

As shown in FIG. 7, the WTG is controlled according to the active current set point at the reduced level, here labelled $I_{p\_calc}$, rather than the higher level it would have ordinarily been operated at if the conventional injection profile was used, labelled $I_{p\_actual}$. As a result, the reactive current level measured at the PoI is the maximum level, $I_{q\_max}$, rather than the lesser value that would have been achieved otherwise, $I_{q\_actual}$.

As shown in FIG. 7, the reduced active current set point, and hence the increased reactive current boost are maintained for the time period B, after which the thermal capacity of the chopper circuit is reached.

As per the method of FIG. 4, a check is performed, and it is determined that the fault has not cleared. The method of FIG. 5 is used.

The remaining time, C, is calculated, such that C=A−B. The active current set point is returned to the maximum level. The compensation equipment is activated and the reactive current level at the PoI is maintained at its maximum level. If the compensation equipment was not activated, the reactive current level would reduce to the level prior to the fault.

Following time period C, the fault clears, and normal voltage levels are regained. Normal operation of the WTG is resumed.

As will be appreciated, variations on the methods of FIGS. 4 and 5 are also possible. For example, where voltage levels rise slowly back towards normal operational levels from a fault level, the voltage level may enter the range of voltages for reactive current boost and subsequently exit the range again. At a low voltage level, it is seen that the conventional active current injection profile sets low active current set points, so reactive current will already be high in this range. Therefore, the reactive current compensation will only be required at higher voltage levels where the voltage level is not within the required range.

It will also be appreciated that, although pre-determined active current injection profiles are described here, a dynamic injection profile for either the conventional profile or the dedicated profile may be generated. The profile may vary depending on operational parameters of the system.

In some examples, alternative renewable energy generators or a hybrid power plant may be operated according to the methods described herein.

Many modifications may be made to the above examples without departing from the scope of the present invention as defined in the accompanying claims.

The invention claimed is:

1. A method for operating a renewable energy generator forming part of a renewable energy power plant, the renewable energy power plant being connected to a power network at a point of connection by a high impedance connecting network, the method comprising: during a fault experienced by the power network: determining an active current set point to enable a reactive current supply boost at the point of connection, the active current set point being based on (i) a voltage level associated with the renewable energy generator and (ii) operational characteristics of at least one of the renewable energy generator, the renewable energy power plant, the power network, or the connecting network; calculating, based at least in part on a determined thermal capacity of a chopper circuit of the renewable energy generator corresponding to an amount of energy that the chopper circuit dissipates before the chopper circuit overheats, a time period for the reactive current boost, the time period being a maximum time for which the active current set point can be maintained; and controlling the renewable energy generator during the calculated time period to alter active current output to the determined active current set point, thereby providing the reactive current supply boost at the point of connection.

2. The method of claim 1, further comprising determining that a voltage level at the point of connection between the power plant and the network is in a pre-determined range, and performing the determining, calculating, and controlling steps if the voltage level is in the pre-determined range.

3. The method of claim 1, wherein the active current set point is based on an active current injection profile derived from the operational characteristics.

4. The method of claim 3, wherein the operational characteristic is impedance of the connecting network.

5. The method of claim 1, wherein determining the thermal capacity of the chopper circuit of the renewable energy generator comprises at least one of: modelling the operation of the chopper circuit and calculating the thermal capacity of the chopper circuit based upon the model; or monitoring at least one parameter of the renewable energy power plant, the power network, the connecting network, the point of connection, or of the renewable energy generator, and calculating the thermal capacity of the chopper circuit based upon the monitored parameter.

6. The method of claim 5, wherein the at least one parameter is an active power output of the renewable energy generator prior to the fault.

7. The method of claim 1, wherein the time period for the reactive current boost is calculated, at least in part, based on a maximum duration of the fault.

8. The method of claim 1, wherein, if the fault is not cleared at an end of the time period, the method further comprises:
calculating a remaining time for the fault;
activating compensation equipment for the remaining period to supply maximum reactive current; and
controlling the renewable energy generator during the remaining time period to alter active current output according to a second active current set point.

9. The method of claim 8, wherein the second set point is based on a second active current injection profile derived from predetermined requirements of the power network.

10. The method of claim 8, wherein the second set point is a maximum active current set point.

11. A non-transitory computer readable medium storing a computer program comprising program code instructions for implementing an operation for operating a renewable energy generator forming part of a renewable energy power plant connected to a power network at a point of connection by a high impedance connecting network, the operation comprising:
during a fault experienced by the power network:
determining an active current set point to enable a reactive current supply boost at the point of connection, the active current set point being based on (i) a voltage level associated with the renewable energy generator and (ii) operational characteristics of at least one of the renewable energy generator, the renewable energy power plant, the power network, or the connecting network;
calculating, based at least in part on a thermal capacity of a chopper circuit of the renewable energy generator corresponding to an amount of energy that the chopper circuit dissipates before the chopper circuit overheats, a time period for the reactive current boost, the time period being a maximum time for which the active current set point can be maintained; and
controlling the renewable energy generator during the calculated time period to alter active current output to the determined active current set point, thereby providing the reactive current supply boost at the point of connection.

12. The medium of claim 11, further comprising determining that a voltage level at the point of connection between the power plant and the network is in a pre-determined range, and performing the determining, calculating, and controlling steps if the voltage level is in the pre-determined range.

13. The medium of claim 11, wherein the active current set point is based on an active current injection profile derived from the operational characteristics.

14. The medium of claim 13, wherein the operational characteristic is impedance of the connecting network.

15. A controller, comprising:
an I/O interface configured to interface with a renewable energy generator forming part of a renewable energy power plant connected to a power network at a point of connection by a high impedance connecting network;
memory containing instructions; and
on or more processors which, when programmed with the instructions, is configured to perform an operation, comprising:
during a fault experienced by the power network:
determining an active current set point to enable a reactive current supply boost at the point of connection, the active current set point being based on (i) a voltage level associated with the renewable energy generator and (ii) operational characteristics of at least one of the renewable energy generator, the renewable energy power plant, the power network, or the connecting network;

calculating, based at least in part on a thermal capacity of a chopper circuit of the renewable energy generator corresponding to an amount of energy that the chopper circuit dissipates before the chopper circuit overheats, a time period for the reactive current boost, the time period being a maximum time for which the active current set point can be maintained for; and controlling the renewable energy generator during the calculated time period to alter active current output to the determined active current set point, thereby providing the reactive current supply boost at the point of connection.

16. The controller of claim 15, wherein the renewable energy generator is a wind turbine generator.

* * * * *